United States Patent [19]

Beermann et al.

[11] 4,228,375
[45] Oct. 14, 1980

[54] DEVICE FOR BRACING AN AIR-GAP WINDING

[75] Inventors: Heinrich Beermann; Dietrich Lambrecht, both of Mülheim, Fed. Rep. of Germany

[73] Assignee: Kraftwerk Union Aktiengesellschaft, Mülheim, Fed. Rep. of Germany

[21] Appl. No.: 934,677

[22] Filed: Aug. 18, 1978

[30] Foreign Application Priority Data

Aug. 23, 1977 [DE] Fed. Rep. of Germany ....... 2737959

[51] Int. Cl.² .............................................. H02K 3/48
[52] U.S. Cl. .................................... 310/214; 310/179; 310/194
[58] Field of Search ................. 310/179, 214, 51, 194, 310/217, 218, 42, 91, 194, 215, 254, 259, 269; 336/197

[56] References Cited

U.S. PATENT DOCUMENTS

| 3,560,776 | 2/1971 | Kildishev | 310/214 |
| 3,761,754 | 9/1973 | Boesel | 310/269 |
| 4,068,142 | 1/1978 | Gillet | 310/214 |
| 4,137,471 | 1/1979 | Sato | 310/51 |

FOREIGN PATENT DOCUMENTS

| 1816283 | 6/1970 | Fed. Rep. of Germany | 310/214 |
| 1,278,308 | 10/1961 | France | 310/214 |
| 393505 | 6/1965 | France | 310/214 |

Primary Examiner—R. Skudy
Attorney, Agent, or Firm—Herbert L. Lerner

[57] ABSTRACT

Device for bracing an air-gap winding in a stator of an electric machine wherein individual winding bars are secured between a radially outer stack of stator laminations and a radially inner nonmagnetic support cylinder, includes spacer wedges disposed between respective pairs of the individual winding bars in circumferential direction, at least some of the spacer wedges being in the form of mounting wedges having dove-tailed extensions received and braced in corresponding recesses formed in the stack of stator laminations at the inner circumference thereof, and the remainder of the spacer wedges being in the form of tightening wedges having tangential bracing means includes at least one flexible tube subjectible to internal pressure, and radial bracing means similarly includes at least one flexible tube subjectible to internal pressure.

6 Claims, 1 Drawing Figure

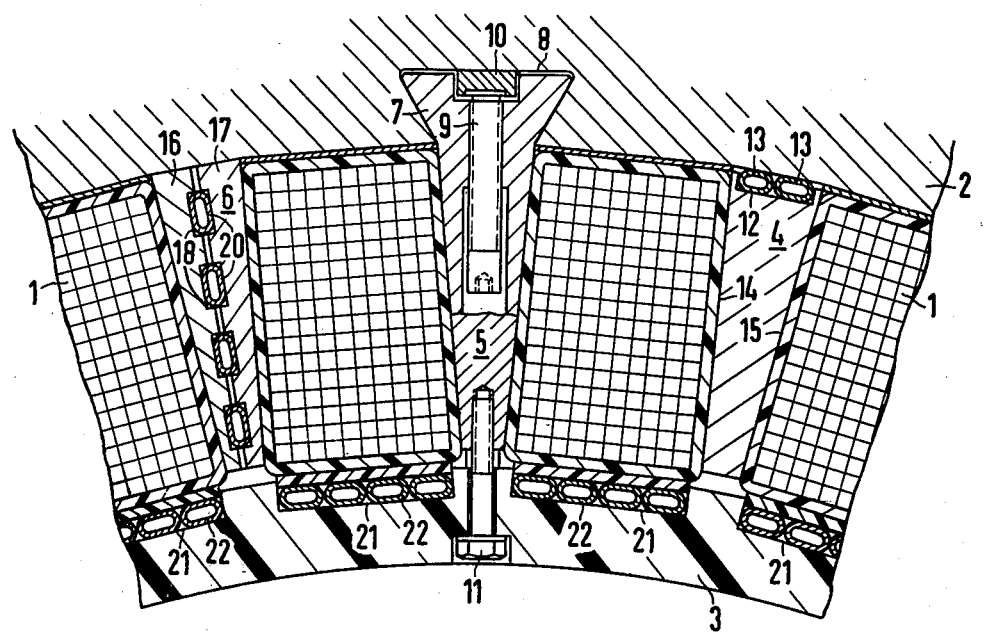

DEVICE FOR BRACING AN AIR-GAP WINDING

The invention relates to a device for bracing an air-gap winding in the stator of an electric machine, especially a turbogenerator, and, more particularly, to such a device wherein individual winding bars are secured between a radially outer stack of stator laminations and a radially inner nonmagnetic support cylinder.

Such a construction has become known heretofore from German Published Prosecution Application DE-AS 21 65 678, wherein the winding bars are disclosed as being received in inwardly opening slots of a hollow cylinder of nonmagnetic steel and retained by an inner support xylinder. Difficulties arise with such a construction, however, due to the pulsating bar forces and settling phenomena caused thereby, which have a detrimental effect upon the insulation of the winding bars and, therefore, require continuous checking of the prestressing of the winding bars, an activity which is possible, however, only through laborious disassembly of the rotor.

It is accordingly an object of the invention to provide a device for bracing an air-gap in the stator of an electric machine wherein prestressing of the bars in radial and tangential direction is always assured, and continuous checking or control of the prestressing force is possible without requiring disassembly of the rotor.

With the foregoing and other objects in view, there is provided, in accordance with the invention, a device for bracing an air-gap winding in a stator of an electric machine wherein individual winding bars are secured between a radially outer stack of stator laminations and a radially inner nonmagnetic support cylinder, comprising spacer wedges disposed between respective pairs of the individual winding bars in circumferential direction, at least some of the spacer wedges being in the form of mounting wedges having dove-tailed extensions received and braced in corresponding recesses formed in the stack of stator laminations at the inner circumference thereof, and the remainder of the spacer wedges being in the form of tightening wedges having tangential bracing means comprising at least one flexible tube subjectible to internal pressure, and radial bracing means similarly comprising at least one flexible tube subjectible to internal pressures.

Such flexible tubes or hoses which are subjected to internal pressure hydraulically or pneumatically have become known in themselves from German Published Non-Prosecuted Application DE-OS 1 613 232, but only as a bracing element between the slot closing wedge and the winding bars of conventional electric machines, the winding received in slots formed in the stack of stator laminations.

With the construction according to the invention, on the other hand, it is possible, in a relatively simple manner, to couple the air-gap winding securely to the enclosing cylindrical stack of laminations in a form-locking and force-locking manner and to apply simultaneously a defined radial and tangential prestressing force to this winding, continuous checking or control of this prestressing force being possible without disassembling the rotor.

In accordance with another feature of the invention radial thrust bolts and pressure pads for bracing said mounting wedges against the stack of laminations are provided. In accordance with a further feature of the invention, the device includes retaining screws for the radially inner support cylinder which are threadedly received in the radially inwardly end of the mounting wedges, the retaining screws extending opposite to and offset in axial direction relative to the radial thrust bolts.

In accordance with an added feature of the invention, the tightening wedges are divided respectively along a middle line thereof, and the flexible tube of the tangential bracing means is disposed at the middle line between the thus-provided wedge halves.

In accordance with an additional feature of the invention, the flexible tube of the tangential bracing means is disposed between the stack of stator laminations and the radially outer side of the tightening wedges.

In accordance with a concomitant feature of the invention, the support cylinder, the mounting wedges and the tightening wedges are formed of high-strength non-metallic material.

Other features which are considered as characteristic for the invention are set forth in the appended claims.

Although the invention is illustrated and described herein as embodied in a device for bracing an air-gap winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a fragmentary cross-sectional view of an air gap winding at the inner circumference thereof incorporating the device for bracing an air-gap winding according to the invention, and showing a type of radial bracing means as well as two different types of tangential bracing means.

As is apparent from the figure of the drawing, the winding bars 1 of the air-gap winding are disposed between a radially outer stack 2 of the stator laminations and a radially inner support cylinder 3 formed of plastic material. In circumferential direction, spacer wedges 4, 5 and 6 are further disposed between the individual winding bars 1 and serve for anchoring and tangentially bracing the winding bars 1 in the following manner. The spacer wedge 5, formed as a mounting wedge, has a dovetail extension 7 at the radially outer end thereof, which is received in a corresponding recess 8 formed in the stack 2 of the stator lamination at the inner circumference thereof. Respective thrust bolts 9, which are threadedly received in corresponding tapped holes formed in respective mounting wedges 5, and are pressed against pressure pads 10 disposed in respective recesses 8 formed in the stator lamination stack 2, stress or brace the mounting wedges 5 so that thereby, a form-locking and force-locking anchoring of the mounting wedges 5 and, consequently, of the entire air-gap winding in the stator lamination stack 2 is obtained. Axially offset from these thrust bolts 9 are retaining screws 11 which are screwed into and secure the support cylinder 3 to these mounting wedges 5.

Alternating with these mounting wedges 5, there are provided between respective pairs of adjacent winding bars 1, spacer wedges formed as bracing or tightening wedges 4 or 6. Because of the high mechanical stresses encountered, the bracing wedges 4, 6 may be formed of non-metallic high strength materials such as glass fiber reinforced epoxy resins or other suitable materials, such as described in U.S. Pat. Nos. 3,243,622 and 3,330,977. A tangential prestressing force can be applied in the following manner. In the case of the bracing or tightening wedge 4, hoses or flexible tubes 13 are disposed between the radially outer end face 12 of the bracing wedge 4 and the inner circumference of the stator lamination stack 2, and are subjected internally to pressurized liquid or pressurized gas by being connected to a corresponding external pressure source and being exposed to pressure according to the desired prestressing force. Through this compressive force, initially acting in radial direction, tangential bracing of the bars 1 is effected through the flanks 14 and 15 of this bracing or tightening wedge 4.

Another possible means for effecting tangential bracing is shown for the bracing or tightening wedge 6, which is divided along the middle line thereof into two wedge halves 16 and 17. Into respective recesses 18 formed along this middle line, hoses or flexible tubes 20, likewise internally subjectible to pressurized liquid or pressurized gas, are disposed, causing the two wedge halves 16 and 17 to spread apart in circumferential direction after the appropriate pressure has been applied and thereby ensure tangential bracing of the bars 1.

Moreover, additional round hoses or flexible tubing 22 is disposed between the winding bars 1 and the support cylinder 3 in corresponding recesses 21; this tubing 22, when subjected to appropriate pressure, produces a defined radial prestressing force in order to prevent vibration of the bars 1 thereby.

With the hereinaforedescribed disposition of the spacer wedges 4, 5 and 6 as well as of the hoses or flexible tubes 13, 20 and 21, which are subjected internally to pressurized liquid or pressurized gas, it is thus possible in a relatively simple manner to retain the air-gap winding radially and tangentially with a defined prestressing force, while continuous checking or control of the prestressing force is possible without disassembling the rotor. The flexible tubes or hoses subjected to pressure are advantageously associated with two or more adjacent parallel circuits, respectively, and can either be run interdependently in sinuous winding from along the circumference, or can be subdivided several times in the length thereof.

It is furthermore advantageous to make all fastening and bracing parts such as the support cylinder 3, the mounting wedges 5 and the bracing or tightening wedges 4 and 6, of a high-strength non-metallic material, such as a plastic material, for heating reasons, and so as to reduce losses.

The hereinafore described construction is applicable both in the region of the lamination stack as well as in the winding head.

There are claimed:

1. Device for bracing an air-gap winding in a stator of an electric machine wherein individual winding bars are secured between a radially outer stack of stator laminations and a radially inner nonmagnetic support cylinder, comprising spacer wedges disposed between respective pairs of the individual winding bars in circumferential direction, at least some of said spacer wedges being in the form of mounting wedges having dove-tailed extensions received and braced in corresponding recesses formed in the stack of stator laminations at the inner circumference thereof, and the remainder of said spacer wedges being in the form of tightening wedges having tangential prestressing bracing means comprising at least one flexible tube subjectible to internal pressure, and radial prestressing bracing means similarly comprising at least one flexible tube subjectible to internal pressure.

2. Device according to claim 1 including radial thrust bolts and pressure pads for bracing said mounting wedges against the stack of laminations.

3. Device according to claim 2 including retaining screws for the radially inner support cylinder being threadedly received in the radially inwardly end of said mounting wedges, said retaining screws extending opposite to and offset in axial direction relative to said radial thrust bolts.

4. Device according to claim 1 wherein said tightening wedges are divided respectively along a middle line thereof, and said flexible tube of said tangential bracing means is disposed at said middle line between the thus-provided wedge halves.

5. Device according to claim 1 wherein said flexible tube of said tangential prestressing bracing means is disposed between the stack of stator laminations and the radially outer side of said tightening wedges.

6. Device according to claim 1 wherein the support cylinder, the mounting wedges and the tightening wedges are formed of high-strength non-metallic material

* * * * *